Patented June 25, 1940

2,205,428

UNITED STATES PATENT OFFICE 2,205,428

MOISTUREPROOFING

James A. Mitchell, Kenmore, N. Y., assignor to E. I. du Pont de Nemours & Company, Wilmington, Del., a corporation of Delaware No Drawing. Application July 15, 1937, Serial No. 153,814

18 Claims. (Cl. 91—68)

This invention relates to compositions of matter, and in particular it relates to the use of such compositions in the moistureproofing of regenerated cellulose film and films of similar character.

Various methods for coating regenerated cellulose film to produce moistureproof wrapping tissues have been disclosed in the prior art, including Charch and Prindle, U. S. Patent No. 1,737,187, issued November 26, 1929. In general, this moistureproofness is obtained by applying to the cellulosic base a composition comprising a cellulosic material such as cellulose nitrate, a wax or wax-like material, a plasticizer, a blending agent, and a solvent or mixture of solvents for such ingredients. The blending agent heretofore customarily used has been a resin which, in many instances, in addition to its blending characteristic, may also have certain film-forming characteristics. Similarly, in the case of certain resins, more or less plasticizing action on the cellulose derivative comprising the base of the moistureproofing composition is exercised by the resin.

In the preparation of moistureproofing coating compositions of the type just described, it has been customary to employ as the resinous constituent natural or synthetic resins such as damar, copal, kauri, polybasic acid-polyhydric alcohol resinous condensation products (with or without the addition of modifying agents such as monohydric alcohols, monobasic acids, drying oils, non-drying oils), etc. Surfaces coated with compositions containing these materials as blending agents are sometimes found to possess certain disadvantages. Very often, when the wax or other moistureproofing agent is in sufficient concentration to produce the highest degree of moistureproofness, a slight haziness results because it has not been rendered completely compatible with the other constituents of the coating composition. Furthermore, thin films and sheets so coated have highly specialized application in uses upon wrapping machinery, and it is highly desirable, if not absolutely necessary, that the surface conditions of the film be accurately adjusted and controlled as to hardness, tackiness at room temperature and at elevated temperatures, and adhesion of the coating to the base film. It is very necessary, for instance, that the surface of the film be neither marred nor impaired as to moistureproofness by the operation of the wrapping machine, nor that the film have a tendency to stick to itself or to other surfaces at ordinary temperatures or at slightly elevated temperatures encountered in the operation of wrapping machinery. It is, however, desirable that a strong adhesive bond be produced by the application of higher temperatures and pressure.

It is therefore an object of this invention to produce novel compositions of matter adapted to be used with a solvent or solvents in the formation of transparent, non-greasy, non-tacky, and moistureproof coatings, sheets, films, etc. Another object of the invention is to provide a moistureproof coating composition comprising a film-forming base, a moistureproofing agent such as a wax, and a blending agent in which larger quantities of wax are compatible than is customarily the case. It is a further object of the invention to produce a novel wax-containing composition for the production of sheets, films, or coatings which, in addition to being transparent, moistureproof, non-tacky, and non-greasy, shall be heat-sealable to such a degree as to enable continuous surfaces coated therewith to be autogenously heat-sealed at moderately elevated temperatures. Other objects of the invention will appear hereinafter.

The objects of this invention are accomplished in general by employing as a blending agent, in moistureproofing compositions, an organic unsaturated material sulfurized at at least some of the double bonds, said organic material being taken from the class consisting of unsaturated oils, such as unsaturated non-drying, semi-drying, or drying oils, unsaturated acids, unsaturated natural resins and unsaturated synthetic resins.

The sulfurized organic materials may be prepared by any method well known to the art. In one method, for example, the unsulfurized material is dissolved in carbon tetrachloride, sulfur monochloride added thereto and the carbon tetrachloride then removed by means of heating over a steam bath. In another method, the unsulfurized material is mixed with powdered sulfur and the mixture heated at an elevated temperature, for example 140° C., until the sulfur is dissolved and the reaction completed.

The sulfurized materials of the present invention are from the class consisting of sulfurized unsaturated oils, sulfurized unsaturated acids, sulfurized natural resins, and sulfurized synthetic resins, whether prepared by the methods hereinbefore indicated or any other method whatsoever. The sulfurizing treatment should not be allowed to proceed so far that the materials are rendered insoluble in the type of solvent bath with which the present invention is concerned. Therefore, by "sulfurized materials" is meant materials of the class referred to which are soluble in organic solvents and which have been produced from unsaturated materials by the addition of sulfur. Such sulfurizing treatment always improves the blending action that such materials possess for improving the compatibility of wax for cellulose derivatives. To illustrate, if the unsulfurized material is substituted for the sulfurized material in Examples 1, 2, 7, 8, and 9 hereinafter, the lacquer coating produced therefrom exhibits a wax blush. Where the unsulfurized material already exhibits some blending action, this blending action will be improved. Even in cases where a material is not initially a blending agent, the sulfurizing treatment in some cases produces a substance which is effective as a blending agent.

Generally speaking, this invention pertains to the provision of moistureproofing coating compositions comprising sulfurized materials in combination with cellulose derivatives and moistureproofing agents such as waxes or wax-like materials. Such compositions may also include plasticizing agents, drying or non-drying oils, resinous materials of either the natural or synthetic varieties, coloring agents either as dyes or pigments, or other modifying agents according to the type of coating compositions preferred. The proportions of the ingedients may be varied within wide limits, depending on the properties desired in the finished coating. The total final film constituents, for convenience referred to as total solids, may be varied according to the build to be attained; the proportion of sulfurized blending agent may determine the hardness, adhesion, and gloss; the plasticizer will assist in obtaining suitable flexibility and other constituents will affect other properties. The coating compositions also include solvents and solvent mixtures which are adapted to the purposes of the coating composition and to the method of applying the coating composition to the desired base and can be adjusted in accordance with the practices of one skilled in the art.

As moistureproofing agents, it is preferable to use waxes or wax-like materials, particularly those of rather high melting point. Paraffin waxes of higher or lower melting points may be used, depending upon the degree of moistureproofness and/or surface characteristics desired. Other waxes, such as ceresin, Japan wax, palm wax, beeswax, Chinese insect wax or other synthetic waves or wax-like materials, or mixtures thereof, may be used. Other materials such as described and claimed in United States Patents No. 2,098,534 to 2,098,542 inclusive, may be used. The term "wax," as used throughout this specification and claims, is intended to include both true waxes (higher monohydric alcohol esters of higher fatty acids) and wax-like materials such as the above. If some of these substances are too soft for the purposes desired, they may be mixed with harder waxes of the group just listed, or with carnauba wax, candelilla wax, or other harder synthetic waxes. Indeed, sometimes it may be desirable to use only the harder waxes such as carnauba or candelilla although it is preferable to employ a wax such as paraffin as the moistureproofing agent and to harden this by the addition of carnauba or candelilla wax, if necessary.

For the cellulose derivative it is possible to use cellulose ethers such as glycol, ethyl, or benzyl cellulose, cellulose esters such as cellulose nitrate, which is particularly useful, cellulose acetate, which is of limited compatibility, and such mixed esters or ether-esters as cellulose acetate-nitrate, cellulose acetate-propionate or ethyl cellulose-nitrate. These cellulose derivatives may be of various degrees of conversion, as, for example, cellulose nitrates of various nitrogen contents.

As plasticizers, it is possible to use any of the well known plasticizers, including such substances as tricresyl phosphate, dibutyl phthalate, dicyclohexyl phthalate, di-methylcyclohexyl phthalate, di-(dimethylcyclohexyl) phthalate, di-cyclohexyl adipate, methyl-(dimethylcyclohexyl) adipate, and butyl benzoyl benzoate. In some instances, it may be possible to use only very small amounts of plasticizer or even to eliminate the plasticizer entirely, since the sulfurized material contributes considerable flexibility to the resulting films. In view of this, it is possible to eliminate special plasticizers and still obtain satisfactory moistureproofing coating compositions by taking advantage of the plasticizing action of the sulfurized material itself. Compositions of this sort are illustrated in Examples 17 and 18, below. Generally speaking, compositions of this type are inferior as regards moistureproofness, flexibility, appearance, etc., and consequently compositions employing an additional plasticizer are to be preferred.

In many instances, it may be desirable to add resinous materials to moistureproofing coating compositions comprising the sulfurized blending agents, and for this purpose any of the natural or synthetic resins commonly available may be used so long as they are compatible and form homogeneous mixtures. Such resins may include the rosinates, damar, copal, kauri, polyhydric alcohol-polybasic acid resinous condensation products, vinyl derivatives, chlorinated diphenyl resins, soluble phenol-formaldehyde resins, or the like.

For the usual coating methods, these compositions must be available as solutions and for this purpose any of the usual solvents and solvent mixtures familiar to the skilled worker in the art will serve. Generally speaking, the solvent will contain a cellulose derivative solvent and a wax solvent as well as a solvent for the sulfurized material, and optionally a diluent. It is apparent that the same solvent may serve both for the sulfurized material and the other constituents, and indeed it may be that the cellulose derivative solvent will also be a wax solvent. A solvent mixture comprising 40–90% ethyl acetate, 10–50% toluene and the balance ethyl alcohol will usually be found to operate satisfactorily. Depending on the amount and nature of the cellulose derivative or the wax, the amount and nature of their respective solvents will vary. Satisfactory solvents for specific compositions are illustrated in the accompanying examples.

The moistureproofing coating compositions may be used on various bases including sheets or films of regenerated cellulose, whether they be made by the viscose process, the cuprammonium process, or by any other manufacturing technique; sheets or films of cellulose ethers such as ethyl, benzyl, or glycol cellulose, cellulose esters such as cellulose nitrate or cellulose acetate, gelatin, casein, parchment, chemically or mechanically treated, or hydrated paper, tissue paper, or the like. Surfaces of metal, wood, etc., may also be coated with these compositions.

In the preparation of a transparent, moistureproof wrapping material, a suitable wax-containing composition comprising a cellulose derivative and a sulfurized material is preferably applied to a transparent base in accordance with the methods known to the art. The solvents may be removed and the coated material subjected to an elevated temperature at least equal to the melting point of the wax, whence a clear, transparent, moistureproof film may be obtained. The technique of this procedure is set forth in such patents as the Charch and Prindle patent noted above.

In preparing moistureproofing coating compositions comprising sulfurized materials, it has been found that the best results are obtained by limiting the relative amounts of the several constituents. The amount of cellulose derivative, for example, may vary from 30–70% or more of the total solids although in most instances 40–60% is to be preferred. If the sulfurized material is simply a blending agent, its amount may be of the order of 1–5%, but if it serves also as a film-forming ingredient, it may constitute 8–30% or more, while if it serves also as a plasticizer, it may be present in amounts as high as 30–50% of the total solids content. Usually, it is desirable to maintain the ratio of sulfurized material to cellulose derivative in the neighborhood of 1:10 although ratios as low as 1:1.2 or as high as 1:50 may sometimes be advantageous.

The wax content of these moistureproofing compositions may vary from 0.5% or 1% to 10% or more of the total solids content. Usually, about 4% is satisfactory although more or less may be found desirable for different purposes. The ratio of wax to sulfurized material may vary from 5:1 to 1:14 although about 1:2 is generally a good combination.

The amount of plasticizer may vary, of course, from none at all up to about 40 or 50% of the solids content of the composition. The ratio of plasticizer to cellulose derivative depends, obviously, on the nature of the cellulose derivative, the nature and amount of wax, and the plasticizer itself, but it has been found that 1:1 to 1:1.5 may produce very good results while an optimum ratio would seem to be about 1:1.25.

The amount of solvent or solvent mixture may vary according to the composition and to the method of application or purpose desired. The viscosity of the coating composition may be controlled by the amount and nature of the solvent and may be adjusted easily to adapt the solution for coating by brushing, spraying, dipping or any other method familiar to the art.

Ordinarily, it is preferred to include a cellulose derivative in the moistureproofing composition. Under certain conditions, however, where a cheaper coating is desired and tackiness is not a detriment, a composition comprising only a sulfurized material and a wax, with or without a plasticizer, may be coated on to a base. A composition of this sort is illustrated in Example 19, below.

Although the specification thus far has been concerned primarily with coating compositions, it is within the scope of this invention, however, to produce self-sustaining films having the solids composition set forth. These films may be prepared in any of the ways known to the art as by casting, choosing suitable solvents and solvent contents to facilitate the operation.

Where percentages and proportions of ingredients are referred to throughout the specification and claims, they are intended to be percentages by weight, or parts by weight.

In order to more fully explain the nature of the invention, the following illustrative examples are given:

EXAMPLES 1–17

| Ingredients | Example Nos. | | | |
|---|---|---|---|---|
| | 1 | 2-3 | 4-5-6-7-8-9-10-11 | 12-13 |
| Paraffin wax | 3.0 | 3.0 | 3.0 | 3.0 |
| Dibutyl phthalate | 11.7 | 12.5 | 12.0 | 10.0 |
| Dicyclohexyl phthalate | 35.3 | 37.5 | 36.0 | 30.0 |
| Nitrocellulose, 11% N | 43.0 | 46.0 | 44.0 | 37.0 |
| Sulfurized material | 7.0 | 1.0 | 5.0 | 20.0 |

| Ingredients | Example Nos. | | | |
|---|---|---|---|---|
| | 14 | 15 | 16 | 17 |
| Paraffin wax | 3.0 | 3.0 | 3.0 | 10.0 |
| Dibutyl phthalate | 12.3 | 13.0 | 10.2 | |
| Dicyclohexyl phthalate | 36.7 | 13.0 | 30.6 | |
| Nitrocellulose, 11.0% N | 45.0 | | 51.2 | |
| Nitrocellulose, 11.6% N | | 56.0 | | |
| Nitrocellulose, 12.5% N | | | | 60.0 |
| Sulfurized material | 3.0 | 15.0 | 5.0 | 30.0 |

Coating compositions are prepared by dissolving 12 parts of the solids compositions, indicated in Examples 1–17, inclusive, in 57 parts of ethyl acetate, 29 parts of toluene, and 2 parts of ethyl alcohol denatured with acetone.

The sulfurized materials of Examples 1, 2, and 5–17, inclusive, are prepared by dissolving a specified amount of material to be sulfurized (as noted in the table below) in 100 c. c. of carbon tetrachloride, adding a specified amount of sulfur monochloride (as noted in the table below), and removing the carbon tetrachloride by means of a steam bath. Quantities specified are in grams.

| Example No. | Material | Amount | Amount $S_2Cl_2$ |
|---|---|---|---|
| 1 | Ester gum | 67 | 11 |
| 2 | Rapeseed oil | 100 | 10.4 |
| 5 | Blown rapeseed oil | 100 | 3.8 |
| 6 | Castor oil / Modified rosin as described in U. S. Patent No. 2,017,866 | 20 / 40 | 9.4 |
| 7 | Soya bean oil | 100 | 11 |
| 8 | Linseed oil | 100 | 11.4 |
| 9 | Pine oil | 100 | 20 |
| 10 | Alpha-terpineol | 100 | 12 |
| 11-12 | Dewaxed damar | 50 | 7.5 |
| 13-14-15 | Wood rosin | 75 | 10 |
| 16-17 | Castor oil | 50 | 4.6 |

The sulfurized materials of Examples 3 and 4 are prepared by mixing 75 grams of oleic acid (Example 3) or 100 grams of cottonseed oil (Example 4) with 6 grams of powdered sulfur, and heating to 140° C. until the sulfur is dissolved and the reaction completed.

EXAMPLE 18

A coating composition is prepared by dissolving 12 parts of a mixture comprising 4% paraffin wax, 61% ethyl cellulose, 25% coumarone-indene resin, and 10% of sulfurized castor oil (prepared as in Examples 16 and 17) in 70 parts of toluene and 18 parts of ethyl alcohol denatured with acetone.

EXAMPLE 19

A coating composition is prepared by dissolving 12 parts of paraffin and 88 parts sulfurized damar (prepared as in Examples 11 and 12) in 194 parts of toluene.

For the purposes of this invention, moistureproof materials are defined as those which, in the form of a thin, continuous and unbroken film, will permit the passage of not more than 690 grams of water vapor per 100 square meters per hour, over a period of 24 hours at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of thin, continuous, unbroken films, applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film, applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.) with a water vapor pressure differential of 50–55 mm. (preferably 53.4±0.7 mm.) of mercury. For convenience, the number of grams of water vapor passed under these conditions may be referred to as the "permeability value." An uncoated sheet of regenerated cellulose having a thickness of approximately 0.0009" will show a permeability of the order of 6,900.

For the purposes of comparison and definition, the following test is used to determine the stick temperature: A web of the material to be tested is moved across a table top and below a brass block with a surface of contact measuring 3½x1¼ inches, and weighing 500 grams, at the uniform rate of 2 meters per minute. The temperature of the brass is slowly raised, say about 7° C. per minute, and the frictional drag upon the film observed. This frictional drag at low temperatures is about 50–100 grams; at some elevated temperature it increases suddenly to several thousand grams, and the temperature at which this occurs is taken as the stick temperature.

Coatings or films produced from the compositions of the present invention have good transparency and flexibility. In the wrapping of articles with this coated film, or in the preparation of containers therefrom, it is often desired to fasten or seal the edges of the material by the application of heat and pressure. While it is thus advantageous that overlapping sections of such film may be caused to firmly adhere together by the application of such pressure and heat, it is not desirable that this should take place at low temperatures such as at room temperature, or temperatures slightly higher which may be encountered in the storage of film or articles wrapped therein, or in packaging operations with the exception of those designed to form such heat seal. Therefore, it is desirable that the temperature required for heat-sealing should be quite high and that no tackiness should exist below this temperature. As noted in the table below, compositions containing the sulfurized materials of the present invention possess a sticking temperature which is much higher than that obtained when the corresponding unsulfurized materials are used.

Table I

Stick temperature—°C.

| Example number | Blending agent | |
|---|---|---|
| | Untreated | Sulfurized |
| 1 | 48 | 55 |
| 2 | 47 | 49 |
| 3 | 46 | 51 |
| 4 | 30 | 39 |
| 6 | 49 | 51 |
| 11 | 50 | 51 |
| 13 | 49 | 54 |
| 14 | 49 | 53 |

Nevertheless, when heat-sealable temperatures are attained the strength of heat-seal bond is at least as great as or greater than when unsulfurized materials are used.

Not only is it desirable that the coating on such film be non-tacky and that it does not stick to other sheets and objects with which it may come in contact, but also that it adhere firmly to the film upon which it is deposited. If this coating tends to become loose and peel off, that section of the film which loses its coating will no longer give adequate protection against the escape of vapors and the material thus lost from the surface of the film may foul apparatus, such as automatic wrapping machinery, giving rise to the spoilage of material, loss in time of operation and additional labor. It has been found that coating compositions which contain these sulfurized materials adhere to the film with great tenacity, thus minimizing these evils.

The surface characteristics of coated objects depend in many instances on the plasticizer content and are consistently improved by a decrease in the plasticizer concentration. Thus, for example, sheets or films of regenerated cellulose coated with moistureproofing compositions must possess good surface so that adjacent sheets will slip properly for handling and will not smear or adhere to one another when stacked. The reduction of plasticizer concentration without impairment and frequently with improvement of moistureproofness, through the use of sulfurized materials, offers opportunity for also improving the surface slip and the like.

By the term "sulfurized unsaturated materials" and similar terms is meant materials which are unsaturated before sulfurization. The materials may or may not become saturated by the sulfurizing treatment.

I claim:

1. A moistureproofing composition suitable for use in moistureproofing non-fibrous transparent cellulosic sheets or films comprising a wax and a volatile organic solvent soluble sulfurized organic material taken from the class consisting of sulfurized unsaturated oils, sulfurized unsaturated acids, sulfurized unsaturated natural resins, and sulfurized unsaturated synthetic resins, there being sufficient wax to give moistureproofness and sufficient sulfurized material to avoid haziness.

2. A moistureproofing composition, suitable for coating non-fibrous transparent cellulosic sheets or films to produce a transparent moistureproof product, comprising a wax, a cellulose derivative, and, as a blending agent, a volatile organic solvent soluble sulfurized organic material taken from the class consisting of sulfurized unsaturated oils, sulfurized unsaturated acids, sulfurized unsaturated natural resins, and sulfurized unsaturated synthetic resins, the quantity of said sulfurized organic material being sufficient to render the moistureproofing agent compatible with the other ingredients of the sheeting coating, whereby haziness in the sheeting coating is prevented and the ratio of the ingredients being:

Wax to sulfurized material___From 5:1 to 1:14
Sulfurized material to cellulose
    derivative_____From 1:1.2 to 1:50

3. A moistureproofing composition, suitable for coating non-fibrous transparent cellulosic sheets or films to produce a transparent moistureproof product, comprising a wax, a cellulose derivative, a plasticizer, and a volatile organic solvent soluble sulfurized organic material taken from the class consisting of sulfurized unsaturated oils, sulfurized unsaturated acids, sulfurized unsaturated natural resins, and sulfurized unsaturated synthetic resins, the quantity of said sulfurized organic material being sufficient to render the moistureproofing agent compatible with the other ingredients of the sheeting coating, whereby haziness in the sheeting coating is prevented and the ratio of the ingredients being:

Wax to sulfurized material___From 5:1 to 1:14
Sulfurized material to cellulose
    derivative_____From 1:1.2 to 1:50
Plasticizer to cellulose derivative_____From 1:1 to 1:1.5

4. A moistureproofing composition, suitable for coating non-fibrous transparent cellulosic sheets or films to produce a transparent moistureproof product, comprising a wax, cellulose nitrate, a plasticizer, and a volatile organic solvent soluble sulfurized organic material taken from the class consisting of sulfurized unsaturated oils, sulfurized unsaturated acids, sulfurized unsaturated natural resins, and sulfurized unsaturated synthetic resins, the quantity of said sulfurized organic material being sufficient to render the moistureproofing agent compatible with the other ingredients of the sheeting coating, whereby haziness in the sheeting coating is prevented and the ratio of the ingredients being:

Wax to sulfurized material___From 5:1 to 1:14
Sulfurized material to cellulose
    derivative_____From 1:1.2 to 1:50
Plasticizer to cellulose derivative_____From 1:1 to 1:1.5

5. A moistureproofing composition suitable for use in moistureproofing non-fibrous transparent cellulosic sheets or films comprising ½ to 10% wax, 30 to 70% cellulose nitrate, up to 50% plasticizer, and 1 to 50% of a volatile organic solvent soluble sulfurized organic material taken from the class consisting of sulfurized unsaturated oils, sulfurized unsaturated acids, sulfurized unsaturated natural resins, and sulfurized unsaturated synthetic resins, together with a solvent in an amount sufficient to produce a homogeneous solution, the quantity of said sulfurized organic material being sufficient to render the moistureproofing agent compatible with the other ingredients of the sheeting coating, whereby haziness in the sheeting coating is prevented.

6. A transparent moistureproof film comprising a non-fibrous base having a moistureproof coating containing a wax and a volatile organic solvent soluble sulfurized organic material taken from the class consisting of sulfurized unsaturated oils, sulfurized unsaturated acids, sulfurized unsaturated natural resins, and sulfurized unsaturated synthetic resins, there being sufficient wax to give moistureproofness and sufficient sulfurized material to avoid haziness.

7. A transparent moistureproof film comprising a non-fibrous base having a moistureproof coating containing a wax, a cellulose derivative, and a volatile organic solvent soluble sulfurized organic material taken from the class consisting of sulfurized unsaturated oils, sulfurized unsaturated acids, sulfurized unsaturated natural resins, and sulfurized unsaturated synthetic resins, the quantity of said sulfurized organic material being sufficient to render the moistureproofing agent compatible with the other ingredients of the sheeting coating, whereby haziness in the sheeting coating is prevented and the ratio of the ingredients being:

Wax to sulfurized material___From 5:1 to 1:14
Sulfurized material to cellulose
    derivative_____From 1:1.2 to 1:50

8. A transparent moistureproof film comprising a non-fibrous base having a moistureproof coating containing a wax, a cellulose derivative, a plasticizer, and a volatile organic solvent soluble sulfurized organic material taken from the class consisting of sulfurized unsaturated oils, sulfurized unsaturated acids, sulfurized unsaturated natural resins, and sulfurized unsaturated synthetic resins, the quantity of said sulfurized organic material being sufficient to render the moistureproofing agent compatible with the other ingredients of the sheeting coating, whereby haziness in the sheeting coating is prevented and the ratio of the ingredients being:

Wax to sulfurized material___From 5:1 to 1:14
Sulfurized material to cellulose
    derivative_____From 1:1.2 to 1:50
Plasticizer to cellulose derivative_____From 1:1 to 1:1.5

9. A transparent moistureproof film comprising a non-fibrous base having a moistureproof coating containing a wax, cellulose nitrate, a plasticizer, and a volatile organic solvent soluble sulfurized organic material taken from the class consisting of sulfurized unsaturated oils, sulfurized unsaturated acids, sulfurized unsaturated natural resins, and sulfurized unsaturated synthetic resins, the quantity of said sulfurized organic material being sufficient to render the moistureproofing agent compatible with the other ingredients of the sheeting coating, whereby haziness in the sheeting coating is prevented and the ratio of the ingredients being:

Wax to sulfurized material___From 5:1 to 1:14
Sulfurized material to cellulose
    derivative_____From 1:1.2 to 1:50
Plasticizer to cellulose derivative_____From 1:1 to 1:1.5

10. A transparent moistureproof film comprising a non-fibrous base having a moistureproof coating containing ½ to 10% wax, 30 to 70% cellulose nitrate, up to 50% plasticizer, and 1 to 50% of a volatile organic solvent soluble sulfurized organic material taken from the class consisting of sulfurized unsaturated oils, sulfurized unsaturated acids, sulfurized unsaturated natural resins, and sulfurized unsaturated synthetic resins, the quantity of said sulfurized organic material being sufficient to render the moistureproofing agent compatible with the other ingredients of the sheeting coating, whereby haziness in the sheeting coating is prevented.

11. A non-fibrous transparent cellulosic sheeting moistureproofing composition comprising, together with sufficient solvent to produce a homogeneous solution, 0.5% to 10.0% wax, 30% to 70% cellulose derivative, up to 50% plasticizer, and 1% to 50% of volatile-organic-solvent soluble material obtained from unsaturated oil by sulfurizing some of the multiple bonds thereof.

12. A non-fibrous transparent cellulosic sheeting moistureproofing composition comprising, together with sufficient solvent to produce a homogeneous solution, 0.5% to 10.0% wax, 30% to 70% cellulose derivative, up to 50% plasticizer and 1% to 50% of volatile organic solvent soluble material obtained from unsaturated oil by sulfurizing some of the multiple bonds thereof, said unsaturated oil being derived from the group consisting of rapeseed oil, castor oil, soya bean oil, linseed oil, cottonseed oil, pine oil and alpha terpineol.

13. A non-fibrous transparent cellulosic sheeting moistureproofing composition comprising, together with sufficient solvent to produce a homogeneous solution, 0.5% to 10.0% wax, 30% to 70% cellulose derivative, up to 50% plasticizer, and 1% to 50% of sulfurized rapeseed oil.

14. A non-fibrous transparent cellulosic sheeting moistureproofing composition comprising, together with sufficient solvent to produce a homogeneous solution, 0.5% to 10.0% wax, 30% to 70% cellulose derivative, up to 50% plasticizer, and 1% to 50% of sulfurized castor oil.

15. A transparent moistureproof sheeting comprising a non-fibrous transparent cellulosic base and a transparent coating thereon, said coating comprising essentially 0.5% to 10% wax, 30% to 70% cellulose derivative, up to 50% plasticizer and sufficient volatile organic solvent soluble sulfurized organic material to render the wax compatible with the other ingredients of the coating whereby haziness in the coating is prevented, said sulfurized material being obtained from unsaturated oil by sulfurizing some of the multiple bonds thereof.

16. A transparent moistureproof sheeting comprising a non-fibrous transparent cellulosic base and a transparent coating thereon, said coating comprising essentially 0.5% to 10% wax, 30% to 70% cellulose derivative, up to 50% plasticizer and sufficient volatile organic solvent soluble sulfurized organic material to render the wax compatible with the other ingredients of the coating whereby haziness in the coating is prevented, said sulfurized material being obtained from unsaturated oil by sulfurizing some of the multiple bonds thereof, said unsaturated oil being derived from the group consisting of rapeseed oil, castor oil, soya bean oil, linseed oil, cottonseed oil, pine oil and alpha terpineol.

17. A transparent moistureproof sheeting comprising a non-fibrous transparent cellulosic base and a transparent coating thereon, said coating comprising essentially 0.5% to 10% wax, 30% to 70% cellulose derivative, up to 50% plasticizer and sufficient sulfurized rapeseed oil to render the wax compatible with the other ingredients of the coating whereby haziness in the coating is prevented.

18. A transparent moistureproof sheeting comprising a non-fibrous transparent cellulosic base and a transparent coating thereon, said coating comprising essentially 0.5% to 10% wax, 30% to 70% cellulose derivative, up to 50% plasticizer and sufficient sulfurized castor oil to render the wax compatible with the other ingredients of the coating whereby haziness in the coating is prevented.

JAMES A. MITCHELL.